United States Patent [19]

Beseke et al.

[11] 4,013,962
[45] Mar. 22, 1977

[54] IMPROVED RECEIVER SELECTING (VOTING) SYSTEM

[75] Inventors: Kermit Myles Beseke; David Gordon Ramsland, both of Schaumburg; Robert Bruce Stedman, Algonquin, all of Ill.

[73] Assignee: Motorola, Inc., Schaumburg, Ill.

[22] Filed: Aug. 14, 1975

[21] Appl. No.: 604,562

[52] U.S. Cl. .................................. 325/304; 325/2; 325/56; 325/402; 325/478
[51] Int. Cl.² .......................................... H04B 1/10
[58] Field of Search ............. 325/2, 31, 56, 62, 64, 325/65, 322, 301–306, 323, 326, 348, 399, 403, 478, 402, 410

[56] References Cited
UNITED STATES PATENTS

| | | | |
|---|---|---|---|
| 3,495,175 | 2/1970 | Munch | 325/65 |
| 3,729,681 | 4/1973 | Elder | 325/304 |
| 3,769,592 | 10/1973 | Espe | 325/478 |
| 3,810,023 | 5/1974 | Crowley et al. | 325/478 |
| 3,831,093 | 8/1974 | Walker | 325/304 |
| 3,939,431 | 2/1976 | Cohlman | 325/478 |

*Primary Examiner*—Robert L. Griffin
*Assistant Examiner*—Jin F. Ng
*Attorney, Agent, or Firm*—James W. Gillman; Victor Myer; Phillip Melamed

[57] ABSTRACT

An improved receiver voting system is disclosed in which the lowest noise audio signal produced by a number of different radio receivers is selected and coupled to a monitoring speaker. Each receiver receives signals from a transmitter and produces either corresponding audio signals or squelch indicating status tones which are then transmitted to a voting (selecting) control center by telephone communication lines. The voting control center then selects the unsquelched receiver audio signal having the lowest noise level and couples this signal to a monitoring speaker.

The voting center indicates which receiver is supplying the selected signal and therefore identifies the most favorable receiver to transmitter signal path. Parallel squelch circuits in each receiver provide for the initial selection of the strongest received signal while preventing the existence of an irratating "squelch tail." Automatic gain control circuitry in the voting control center compensates for loss variations between the different transmission lines coupling signals to the voting control center. Status tone decoders in the voting control center prevent the selection of the squelch indicating status tone as the receiver signal having the lowest noise level. The voting control center has circuitry for switching in a status tone notch filter and changing the response time of the status tone decoder whenever a squelch indicating status tone is anticipated by the control center. Each receiver produces an audio pause which precedes the production of a squelch indicating status tone, and this enables the voting control center to anticipate the status tone and to rapidly respond to its occurrence.

22 Claims, 9 Drawing Figures

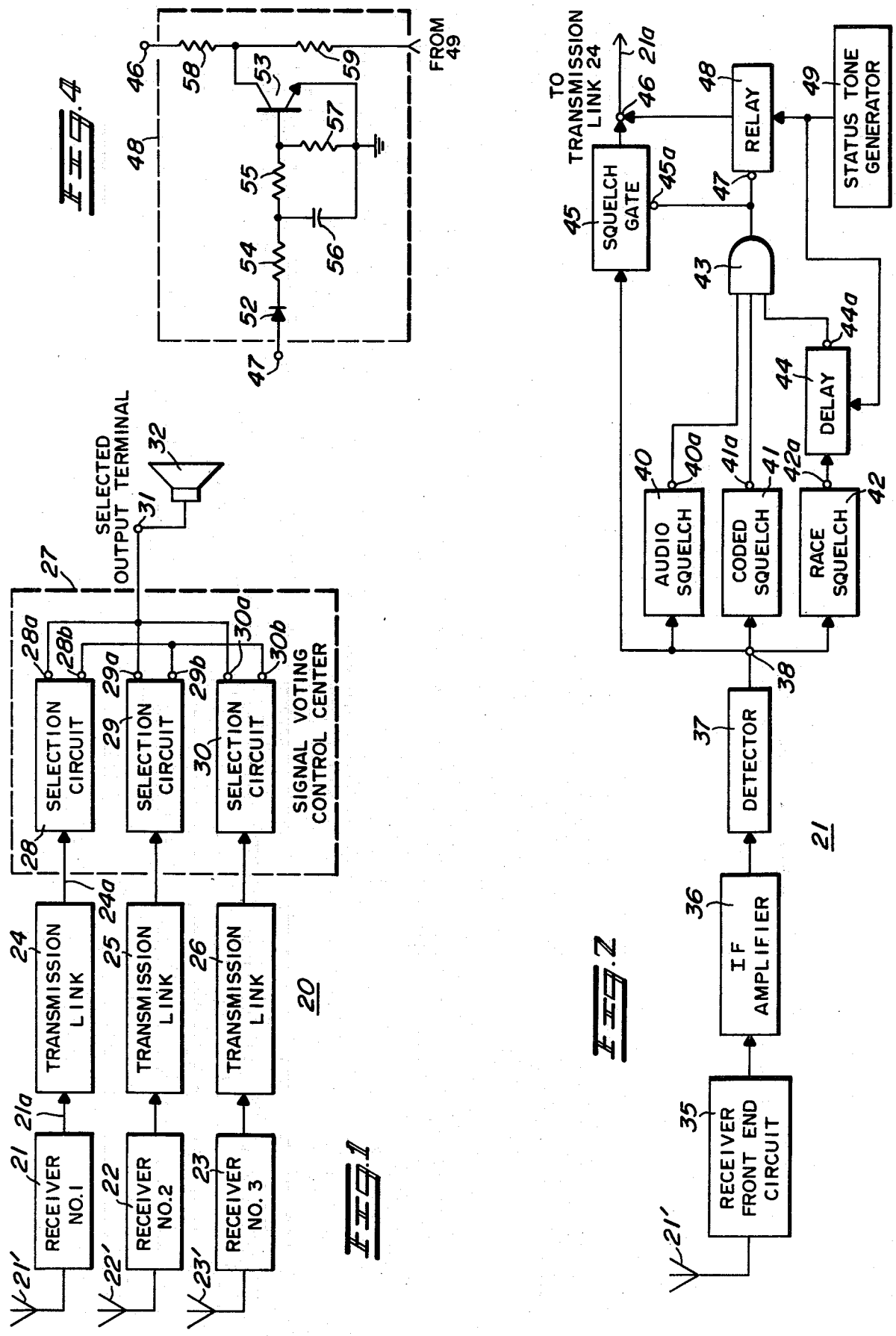

IMPROVED RECEIVER SELECTING (VOTING) SYSTEM

CROSS REFERENCE TO RELATED APPLICATIONS

The present invention is related to the invention described in the copending U.S. patent application entitled "Noise Floor Indicative Circuit", Ser. No. 604,563 filed Aug. 14, 1975.

BACKGROUND OF THE INVENTION

The invention relates generally to the field of receiver selecting systems which select the most useable communications signal produced by one of a plurality of receivers. The invention more particularly relates to such systems in which each receiver output signal is transmitted over an ordinary telephone communication line to a central voting (selecting) control center.

In many radio communication systems designed to service a large area, it is often desirable to provide a number of different receivers, each positioned at a different location within the area to be serviced. The receivers will have overlapping effective reception ranges so that any message transmitted within the area will be picked up by at least one receiver. When a transmitted signal is received by several different receivers, a selection of the receiver producing the most desirable detected output signal should be made, so that only this signal is selected for use by the communications system. However in many such systems, one receiver will not continue to produce the best signal during the entire transmitted message because of changes in atmospheric conditions and changes in the transmitter location (e.g., when the transmitter is attached to a moving automobile). Thus the receiver selection decision must be either continuously or periodically updated. Several prior art systems do not update the receiver selection decision and thus are unable to always monitor the best received signal.

Most of the prior receiver voting systems couple the detected audio signal to a comparison location where the signal selection is then made. The prior systems do not compensate, or even attempt to compensate, for the variable system losses which can occur in the different signal paths between the receivers and the comparison location. Therefore prior systems can mistakenly select a receiver because the actual receiver producing the best detected audio signal is coupled to the comparison location by a signal path which has more or less loss associated with it than other signal paths. When the signal coupling apparatus consists of telephone transmission lines, as is the case in the present invention, the transmission losses can vary from hour to hour. Thus in a telephone line coupled system, the variable transmission losses may degrade the total communication system integrity.

Some prior systems produce a DC signal at the receiver, which is related to the quality of the detected audio signal, and transmit this DC signal to the comparison location. These systems cannot use standard telephone transmission lines. Other prior art systems produce coded audio tones at the receiver which indicate the quality of the detected audio signal. These coded tones are transmitted simultaneously with detected audio signal over standard telephone lines. At the signal comparison location, notch filters remove these signal quality coding tones from the received audio signal. The resultant frequency spectrum reduction of the received audio, caused by these filters, can severely impair the quality (fidelity) of the selected audio signal.

Another prior art system uses a signaling tone, which exists sequentially with the detected audio signals, to indicate whether the receiver is in a squelched or unsquelched condition. This prior system detects the signal quality of the audio signal received at the comparison location by using a log amplifier followed by an envelope detector followed by a valley detector to produce a DC signal indicative of the noise level of the incoming audio signal. The system uses a tone detector to determine when the receiver is squelched or unsquelched and thereby prevents the selection of a squelch indicating tone as the best (lowest noise level) incoming audio signal. The tone detector in this prior art system cannot be designed to rapidly respond to the squelch indicating tone without creating a audio signal falsing problem. This system also has no provision for equalizing the variable losses contributed by the transmission lines between the receivers and the comparison location. Also, the signal initially chosen in this prior art system is randomly selected and therefore will not normally correspond to the best audio signal produced by a receiver.

In some of the prior systems, no indication is given of which of the plurality of receivers is producing the selected signal. This information defines the optimum transmitter to receiver signal path. By not providing or using this information, these prior art systems are inefficient during any signal transmissions from the central control center location to the transmitter.

SUMMARY OF THE INVENTION

An object of the present invention is to provide an improved receiver voting system for selecting at least one of several signals to be monitored which overcomes all of the aforementioned deficiencies.

An additional object of the invention is to provide an improved receiver voting system in which variable transmission losses between the receivers and a comparison location are substantially equalized.

Another object of the invention is to provide an improved signal decoding system and loss of signal activity detector adaptable for use in a receiver voting system.

Still another object of the invention is to provide an improved receiver voting system which initially selects the strongest received signal.

A further object of the invention is to provide an improved receiver voting system which includes switchable notch filters that anticipate and remove squelch indicating signaling tones from the signal being monitored.

A still further object of the invention is to provide an improved receiver voting system which includes circuitry for anticipating the occurrence of a signaling tone and then rapidly responding to it.

In one particular embodiment of the present invention, an improved receiver voting system for selecting at least one of several signals to be monitored is provided, said system comprising: a plurality of receivers, each receiver including means for receiving input signals and producing an output signal, said output signal corresponding to said input signals in response to said input signals having a magnitude equal to and above a predetermined level and corresponding to a predetermined status signal in response to the magnitude of said input signals being below said predetermined level; a plurality of transmission line means for coupling the output signals of each of said plurality of receivers to a comparison location; signal voting circuit means located at said comparison location for receiving the output signals of each of said receivers and selecting, for monitoring purposes, the one of said output signals which has the optimum signal quality level of all of the received output signals which correspond to said input signals; said voting circuit means including, decoder means for producing detect signals associated with any of said output signals which correspond to said status signal for at least a minimum time duration, said detect signals adaptable for use in preventing the selection of any output signal which corresponds to said status signal, loss of activity detector means for detecting the presence of a pause in the activity of any of the output signals, and circuitry for coupling said loss of activity detector means to said decoder means and, in response to a pause being detected in any of said output signals, reducing said minimum time duration of said decoder means for any of said output signals which include a detected pause.

The preceding embodiment of the present invention concerns the insertion of an audio pause before the production of the squelch indicating status tone by a receiver. An audio pause detector, at the comparison location, anticipates the occurrence of the squelch indicating status tone by detecting an audio pause and sensitizes the status tone decoder in addition to inserting a switchable status tone notch filter which prevents the status tone from being coupled to the speaker. The sensitizing of the status tone decoder provides a fast response of this decoder to a true status tone generation while preventing the status tone decoder from falsely responding to a receiver detected audio signal which only momentarily corresponds to the status tone. The technique of changing the response time of a decoder when coding signals are anticipated can be applied to any circuit receiving sequential coding signals and information signals.

Basically, each receiver in the system produces an output signal which corresponds either to a status tone, which indicates that the receiver is in a squelched condition, or to audio signals corresponding to the received input signals, which indicates that the receiver is in an unsquelched condition. The receiver output signals are coupled to a central comparison location over standard telephone lines. At the comparison location, an associated signal related to the signal quality of each of the received output signals is generated. The signal quality signals are a measure of the signal to noise ratio of each of the received output signals and therefore are also related to the background noise level of each of the received output signals. The signal quality signals are then compared and the unsquelched receiver output signal having the best signal quality signal is selected as the output signal having the optimum signal quality level. This optimum output signal is then coupled to a monitoring load, such as a speaker. An LED (light emitting diode) provides an indication of which receiver is producing the selected output signal. By determining which receiver is producing the optimum output signal, the optimum transmitter to comparison location signal path has been determined.

The term "signal quality" as used in this specification includes any rating of a signal which is related to its background noise floor level. Thus the term includes the signal to noise ratio of a signal. The term "for monitoring purposes" as used in the present specification includes any uses of a signal, such as further processing, retransmitting, or coupling the signal to a speaker.

According to another aspect of the present invention, the variable signal losses contributed by the telephone transmission lines are equalized by a plurality of AGC (automatic gain control) circuits located at the comparison location. Each AGC circuit amplifies a received output signal and maintains the amplified output signal at a constant amplitude level whenever the amplitude signal corresponds to the squelch indicating status signal. By precisely controlling the magnitude of the status signal generated by each squelched receiver and also controlling the amplified output signal level produced by each AGC circuit, the different signal losses (contributed by each of the telephone lines which couple a receiver to the comparison location) are precisely equalized during a status tone transmission and therefore substantially equalized during any other transmission.

Another aspect of the present invention provides for the initial selection, as the signal to be monitored, of the strongest input signal received by any receiver. This strong signal selection is accomplished by using a receiver squelch circuit having a turn-on time delay which is variable in accordance with the strength of the received signal. By using such a squelch circuit in each of the receivers, the initially selected signal will always correspond to the strongest, and therefore probably the optimum, received input signal. A fast squelch circuit is connected in parallel with the variable time delay squelch circuit in order to prevent the occurrence of a squelch tail when the receiver returns to a squelched condition.

In addition, the present invention provides an improved activity or pause detector which operates by comparing an input signal with the background noise level of the input signal in order to accurately determine the amount of input signal activity. The improved activity detector is used with a line failure detector in a receiver voting system to provide a system capability for ignoring any receiver output signal which does not have a significant amount of signal activity above its background noise level for a substantial amount of time.

BRIEF DESCRIPTION OF THE DRAWINGS

For a more complete understanding of the invention reference should be made to the drawings, in which:

FIG. 1 is a block diagram of a receiver voting system;

FIG. 2 is a block diagram of one of the receivers illustrated in FIG. 1;

FIG. 4 is a schematic diagram of the relay illustrated in FIG. 2;

DESCRIPTION OF THE PREFERRED EMBODIMENT

Figure 3:
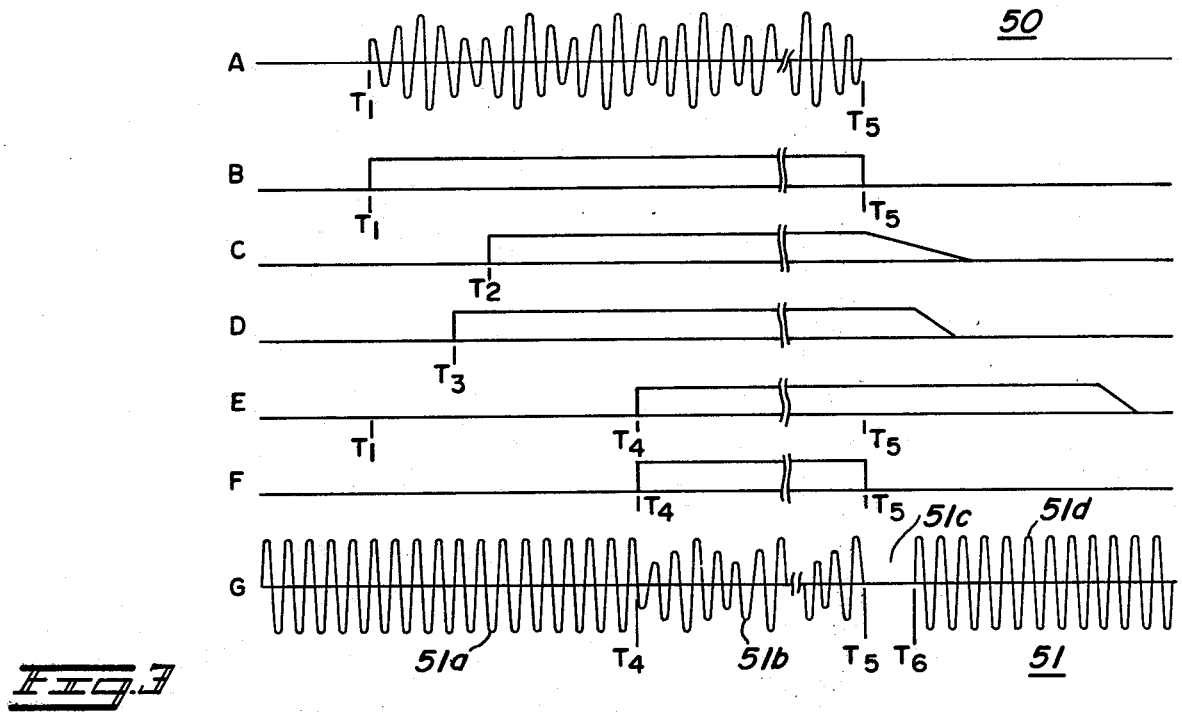
FIG. 3 is a series of graphs illustrating voltage waveforms associated with the circuit shown in FIG. 2.

FIG. 1 illustrates a receiver voting system 20 which basically comprises three receivers 21, 22, and 23 coupled by three independent transmission linking networks 24, 25, and 26, respectively, to a single signal voting control center 27 (shown dashed). The voting center 27 comprises three selection circuits 28, 29 and 30 coupled to the transmission links 24, 25 and 26, respectively. Each selection circuit has a corresponding audio output terminal 28a, 29a, and 30a and a corresponding noise level reference terminal 28b, 29b, and 30b. All of the noise level reference terminals (28b, 29b and 30b) are connected together and each of the audio output terminals (28a, 29a and 30a) is connected to a common selected output terminal 31 which is coupled to a speaker 32 which serves as a monitoring audio load.

Each receiver, such as receiver 21, receives input signals from its own associated antenna, designated by prime notation (e.g. 21'), and produces output signals which are coupled to the signal voting center 27 by a transmission means, such as transmission link 24. Each of the selection circuits (28-30) then separately processes a received output signal, develops a signal quality signal related to the noise level of this output signal, compares this signal quality signal to the signal quality signals associated with all of the other received output signals (via the connections to terminals 28b, 29b and 30b), and determines which one, if any, of the received output signals should be selected for monitoring purposes and coupled to the selected output terminal 31. Thus the receiver voting system 20 determines which one of the receivers 21-23 (and associated transmission links 24-26) is producing a desired signal output.

Each of the transmission links illustrated in FIG. 1 is a standard telephone communication line and therefore has an inherent limited audio pass band ranging from approximately from 300 to 3,000 Hz. It is contemplated by the present invention that the receivers 21-23 are FM (frequency modulation) receivers which contain squelch circuits. These receivers provide a detected audio signal to the transmission links 24-26 whenever the received FM signals have magnitudes above the squelch levels of the receivers. While only three receivers are illustrated in FIG. 1, the present invention is readily adaptable for any number of receivers. While a single speaker is shown coupled to the selected output terminal 31, other uses for the selected signal present at this terminal are within the scope of the present invention.

The receiver voting system 20 will now be described with specific references to the signal path represented by the receiver 21, the transmission link 24 and the selection circuits 28. The receiver is connected to the transmission link by a conductor 21a and the transmission link is connected to the selection circuit by a conductor 24a. Since the operation of the components in other signal paths is identical, these components (such as receiver 22 and selection circuit 30) will not be described. Identical numbers will be used to identify corresponding components and terminals which are common to more than one figure.

Referring to FIG. 2, a block diagram of the receiver 21 shown in FIG. 1 is illustrated. The receiver includes a standard receiver front end circuit 35 which receives audio modulated RF (radio frequency) signals from the antenna 21' and supplies selected and amplified RF signals to an IF stage amplifier 36. The IF stage supplies amplified signals to an FM detector 37 which in turn produces detected audio output signals at a terminal 38. The components 35 through 37 comprise standard FM receiver circuitry which is well known in the prior art and thus will not be discussed in any detail.

The audio terminal 38 provides signals to an audio squelch circuit 40, a coded squelch circuit 41, and a race squelch circuit 42. Each of the squelch circuits 40, 41 and 42 provides a squelch indicating logic voltage at an associated output terminal 40a, 41a and 42a, respectively. The output terminals 40a and 41a are directly connected as inputs to an AND gate 43 and the output terminal 42a is coupled as an input to the AND gate 43 through a delay circuit 44 having an output terminal 44a directly connected to the AND gate.

The audio output terminal 38 is also directly connected to the input of a squelch gate 45 which has its output connected to a summing terminal 46 that is directly connected to the transmission link 24 by conductor 21a. A control terminal 45a of the squelch gate 45 receives a control voltage from the logic output of the AND gate 43 which also is connected to a control terminal 47 of a relay device 48. The relay 48 receives signal tones from a status tone generator 49 and passes these tones on to the summing terminal 46 in response to the voltage present at the control terminal 47. The output of the status tone generator 49 is also coupled to the delay circuit 44 to provide a stable time reference signal so that the delay circuit can maintain a precise amount of time delay. The status tone generator 49 is an oscillator for providing a fixed frequency status tone which serves as a squelch indicating signal to indicate when the audio gate 45 prevents the passage of audio signals from the terminal 38 to terminal 46.

In radio receivers, the detected audio signal has a noise content which is inversely related to the strength of the incoming RF signal. When an audio gate prevents the passage of noisy detected audio signals to a speaker, the receiver is commonly said to be in a "squelched" condition. When the incoming RF signal is above a certain predetermined level, the detected audio output will have less noise and this will result in passing audio signals to the speaker. The circuits that control the actuation of the audio gate are normally said to form a "squelch circuit." In the present invention, the actuation of the squelch gate 45 is controlled by the AND gate 43 which receives control logic inputs from each of the three squelch circuits 40, 41 and 42 which are connected in parallel between the audio output terminal 38 and the AND gate 43.

The audio squelch circuit 40 represents a relatively fast squelch circuit which senses the audio signal noise level present at the terminal 38 and rapidly produces a corresponding high or low control logic voltage at the terminal 40a in response thereto. Such squelch circuits are commonly used in FM radio equipment and normally produce a logic response after a short period of time which is relatively independent of the magnitude of the noise level of the audio signal, the audio noise level being inversely related to the strength of the received FM signal at 21'.

The race squelch circuit 42 senses the noise level and produces delayed logic signals at the terminal 42a, the amount of delay depending upon the strength of the audio noise signal present at terminal 38. The basic characteristic of the race squelch circuit 42 is that is produces a delayed logic response to an incoming signal with the amount of delay depending upon the strength of the signal received by the receiver 21. Such circuits are known in the prior art. The squelch circuit described in U.S. Pat. No. 3,769,592 uses signal strength in a similar manner to produce variable squelch turn-off delays, whereas the circuit 42 uses signal strength to produce variable squelch turn-on delays.

The coded squelch circuit 41 produces a high logic level at its output terminal 41a only after a predetermined audio code has appeared at terminal 38. Prior types of these circuits include tone coded squelch circuits, in which a sequence of predetermined audio tones must be identified before a squelch gate is opened, and digital squelch circuits, in which a predetermined digital code must be identified before a squelch gate is opened. The basic characteristic of the squelch circuit 41 is that a high logic level is produced at terminal 41a only after a predetermined code has been identified.

A substantially long period of time may be required before a high logic state is produced at the terminal 41a, depending upon the length of the code which must be identified. To insure that the AND gate 43 will produce a high logic output in response to a signal which is time related to the magnitude of the audio noise signal present at terminal 38, the delay circuit 44 is required to delay the race squelch logic signal present at terminal 42a until after the occurrence of high logic states on terminals 40a and 41a. A high logic output of the AND gate 43 will occur when all of the logic inputs are high and this will occur at a variable time after a coded audio signal occurs at the terminal 38. This variable time will be related to the strength of the background noise of the audio signal, and consequently, that one of the receivers 21–23 in FIG. 1 which receives the strongest FM signal will be the first one to have its corresponding squelch gate opened. This will result in the initial selection of the strongest received signal by the voting control center 27, as will be more fully explained subsequently.

The operation of the components in FIG. 2 which comprise the receiver 21 will now be explained with reference to the voltage waveforms illustrated in the FIGS. 3A–3G. The vertical and horizontal axes of these figures correspond to amplitude and time respectively, and all of the FIGURES have the same horizontal scale.

The FIG. 3A is a graphical representation of a typical detected audio voltage signal 50 which is produced at the terminal 38 in response to an RF signal being received by the antenna 21'. The audio signal 50 commences at a time $T_1$ and terminates at a later time $T_5$. The FIGS. 3B–F are graphical representations of positive voltage pulses which illustrate the output logic responses of various receiver circuits to the audio signal 50. The FIG. 3G illustrates an output audio signal 51 which is created by the receiver 21 at the terminal 46 in rsponse to the audio signal 50. More specifically, FIGS. 3B, 3C and 3D illustrate the logic responses of the squelch circuits 40, 41 and 42, respectively, and FIGS. 3E and 3F illustrate the logic response of the delay circuit 44 and the AND gate 43, respectively.

The logic pulse in FIG. 3B begins at the time $T_1$ and ends at the time $T_5$. This illustrates the fact that the audio squelch circuit 40 responds very rapidly to the audio signal 50 and produces a logic output which substantially coincides with the occurrence of the signal 50. The pulses in FIGS. 3C, 3D and 3F begin at times $T_2$, $T_3$, and $T_4$ respectively, where $T_3$ occurs after $T_1$, $T_2$ occurs after $T_3$, and $T_4$ occurs after $T_2$. The AND gate output pulse illustrated in FIG. 3F begins at $T_4$ and ends at $T_5$. The receiver output signal 51 in FIG. 3G comprises a fixed frequency status tone 51a which exists prior to time $T_4$, an audio signal 51b between $T_4$ and $T_5$, an audio pause (lack of signal activity) 51c between time $T_5$ and a later time $T_6$, and a status tone signal 51d which exists after time $T_6$.

The fast response of the audio squelch circuit 40 is used to prevent the occurrence of a "squelch tail," which is a noise burst caused if the squelch gate closes a substantial time after the incoming RF signal has terminated. The rapid response of the squelch circuit 40 to a change in the noise level present at the terminal 38 causes the output logic of the AND gate 43 (FIG. 3F) to also respond rapidly to a loss of the incoming FM signal. Since the squelch gate 45 is directly controlled by the output logic of the AND gate 43, the creation of a lengthy squelch tail is effectively prevented.

The FIGS. 3A–3F illustrate that the response (at time $T_2$) of the race squelch circuit 42 had to be delayed by the delay circuit 44 until time $T_4$ in order to insure that the AND gate 43 would be actuated by the response of the squelch circuit 42. In systems where a selecting code is not used, no coded squelch or delay circuit would be necessary.

The creation of the signal 51 (FIG. 3G) by the receiver 21 will now be described more fully.

The relay device 48 receives at its control terminal 47 the same logic states that control the squelch gate 45 (FIG. 3F). The basic function of the relay 48 is to respond to the logic state which closes the squelch gate 45 by supplying a status tone signal from the generator 49 to the summing terminal 46. When the squelch gate 45 is opened, the relay 48 removes the status tone signal from terminal 46. Thus the terminal 46, which in the preferred embodiment is merely the connection point of two wires and which is subsequently coupled to the transmission link 24, either receives an audio signal from the squelch gate 45, an audio signal pause, or a status tone signal from the relay 48 which indicates that the squelch gate 45 is closed.

A typical embodiment of the relay 48 is illustrated in FIG. 4 with identical reference numbers used for components which are common to FIGS. 2 and 4. The relay comprises a diode 52 having its anode connected to the terminal 47 and its cathode connected to the base of an NPN transistor 53 through a resistor 54 followed by a series connected resistor 55. The junction between the resistors 54 and 55 is connected to ground through a capacitor 56. The transistor 53 has its base connected to ground through a resistor 57, its emitter connected directly to ground, and its collector connected to terminal 46 through a resistor 58 and to the status tone generator 49 through a resistor 59.

A high logic level present at terminal 47 will forward bias the diode 52 and rapidly charge the capacitor 56 through the resistor 54. This will result in the saturation of the transistor 53 which effectively prevents the status tone signals created by the generator 49 from reaching the summing terminal 46. When a low logic level is subsequently produced at terminal 47, the diode 52 will be reversed biased and the capacitor 56 will discharge through resistor 55 which is much higher in resistance value than resistor 54. Thus the transistor 53 will stay in saturation for an appreciable time after a low logic state is created at terminal 47.

While the squelch gate 45 will immediately open in response to a low logic state at terminal 47, the status tone signal will not be immediately applied to the summing terminal 46. This will create a delay or audio pause (51c) in the signal present at the terminal 46, and therefore also in the output signal coupled to the voting control center 27 by the transmission link 24.

The signal waveform which is present at terminal 46 is illustrated in FIG. 3G as the signal 51. At the time $T_4$, the AND gate 43 produces a high logic level, which simultaneously closes the squelch gate 45 and terminates the status tone signal received by the terminal 46. At a later time $T_5$ the squelch gate 45 is opened, and at a still later time $T_6$ the status tone signal is reapplied to the summing terminal 46. Thus an audio pause 51c existing between times $T_5$ and $T_6$ has been inserted before the squelch indicating status tone signal has been reapplied to the summing terminal 46. An audio pause of 15ms (milliseconds) was used in the preferred embodiment. This inserted pause is used by the selection circuit 28 in the voting control center 27 to anticipate the occurrence of a squelch indicating status tone as will subsequently be explained.

Both the detected audio signals from the receiver 21 and the status tone signal must travel through the transmission link 24. Therefore the frequency of the status tone signal must be within the bandpass range of the transmission link. Since each transmission link in the preferred embodiment of the receiver voting system 20 is a telephone transmission line, a status tone signal of 2,175 Hz was chosen.

Figure 5:
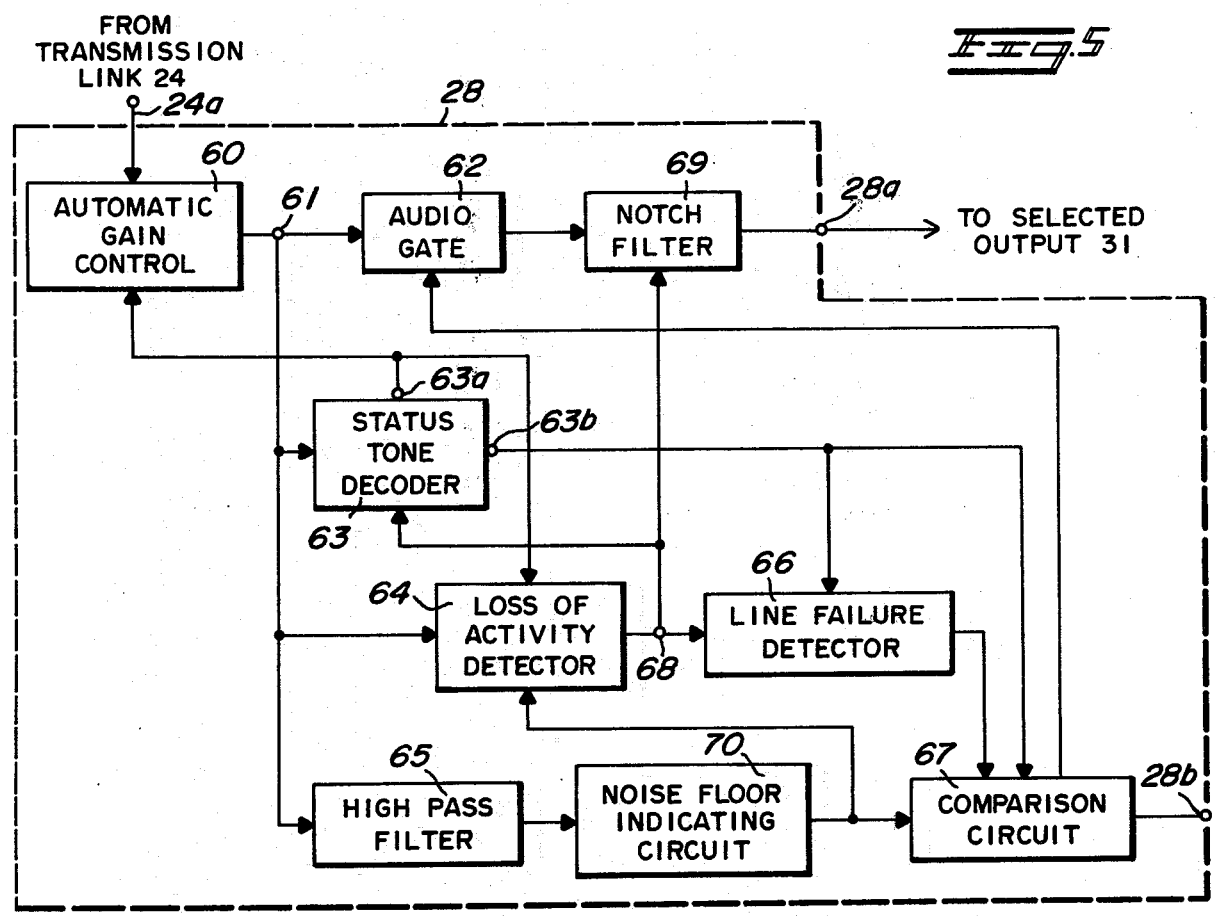
FIG. 5 is a block diagram of one of the selection circuits illustrated in FIG. 1.

Referring now to FIG. 5, a block diagram of the selection circuit 28, previously shown to in FIG. 1, is illustrated. The selection circuit is shown dashed and identical reference numbers are used for the components which are common to FIGS. 1 and 5. The general operation of the selection circuit 28 will now be discussed with specific reference to the block components illustrated in FIG. 5. Subsequently, the operation and structure of the components in FIG. 5 will be discussed more fully.

The receiver output signal from the transmission link 24 (conductor 24a) is coupled to an automatic gain control (AGC) circuit 60 which provides an amplified receiver output signal at a terminal 61. An audio gate 62, a status tone decoder 63, a loss of activity detector 64, and a high pass filter 65 are all coupled to the terminal 61 and receive the amplified output signal.

The status tone decoder 63 produces a high output signal at a terminal 63a if the frequency of the amplified signal at the terminal 61 substantially corresponds to the frequency of the squelch indicating status tone, 2175 Hz. The terminal 63a is coupled to the AGC circuit 60 to activate the gain controlling mechanism of this circuit and thereby provide a constant output level for the amplified receiver output signal at the terminal 61 when a squelch indicating status signal is being received.

The terminal 63a is also coupled to the loss of activity detector 64 for control purposes. A control logic signal complimentary to the one provided at terminal 63a is produced by the decoder 63 at a terminal 63b which is coupled to a line failure detector circuit 66 and a noise level comparison circuit 67.

The loss of activity detector 64 produces a control logic signal at a terminal 68 whenever the audio signals present at terminal 61 contain a signal pause. The terminal 68 is coupled, for control purposes, to the status tone decoder 63, the line failure detector circuit 66, and a switchable notch filter 69 which is connected between the audio gate 62 and the audio output terminal 28a.

The highpass filter 65 is coupled to a noise floor indicating circuit 70 and transmits a portion of the frequency spectrum of the audio signal present at terminal 61 thereto. The indicating circuit 70 produces a DC noise level indicating signal related to the background noise level of the audio signal present at terminal 61. The noise circuit 70 is coupled to the loss of activity detector 64 and the noise level comparison circuit 67 and provides these components with the DC noise level indicating signal.

The comparison circuit 67 is coupled to the terminal 28b and the audio gate 62. The circuit receives a reference noise level signal from the terminal 28b, compares this signal with the noise indicating signal from the circuit 70, and produces a control select signal which is coupled to the audio gate 62.

The failure detector 66 is coupled to the comparison circuit 67 and produces a control logic signal that disables the comparison circuit in the event that a line failure is detected. A line failure is determined by the absence of an audio signal at the terminal 61 for a substantial amount of time. The detector 66 receives information about the absence of audio activity from connections to the detector 64 and the decoder 63.

The components 60 through 70 comprise the selection circuit 28, and the functions of each of these components will now be discussed more fully.

The AGC circuit 60 is a AGC circuit which is actuated by a high logic state from another component (63). The decoder 63 produces this high logic actuation signal when the signal at the terminal 61 corresponds to the status tone signal. When actuated, the AGC circuit 60 functions to produce an amplified constant amplitude output signal at terminal 61 in a manner similar to standard AGC circuits.

When the amplified output signal present at terminal 61 no longer substantially corresponds to the status signal, a low logic state is produced at terminal 63a which terminates the gain varying action of the AGC circuit 60. The gain of the AGC circuit is maintained at the value which existed immediately prior to the creation of the low logic, or AGC disable, signal at the terminal 63a.

The different variable losses contributed by each of the transmission links 24 through 26 to each of the output signals created by the receivers 21 through 23 are equalized by maintaining a constant amplitude for the squelch indicating status tone signals which are delivered to each of the transmission links (24–26) and by adjusting the gain of each AGC circuit in each of the selection circuits (28–30) to maintain the amplified receiver output signal at a constant known level. Since the transmission links are standard telephone cables, these variable losses will not change substantially during the transmission of any audio signal, but may substantially change over long periods of time. Thus the inclusion of an AGC circuit (60) in each of the selection circuits 28–30 will precisely equalize the variable transmission losses during the simultaneous transmission of status tone signals by each link (24–26) and substantially equalize these losses during the transmission of detected audio output signals.

By initially adjusting the AGC circuits in each of the selection circuits 28–30 and maintaining the output magnitudes of the status tone generators in the receivers 21–23 at a constant level, the output signal levels of each of the AGC circuits in each of the selection circuits will be maintained at equal levels. This will enable each selection circuit to develop a signal quality signal which can be directly compared with the signal quality signals developed by other selection circuits.

The AGC circuit 60 consists basically of a standard AGC circuit which is disabled by a control signal and maintains the gain it had immediately prior to being disabled. Since such a circuit can be implemented by using techniques which are well known in the prior art, such as combining a relay type device in the feedback loop of an AGC circuit, the structure of the AGC circuit 60 will not be discussed in great detail.

Such a circuit 60 could typically consist of a high impedance voltage amplifier in the control loop which monitors the voltage of a capacitor, the capacitor voltage being varied in accordance with the AGC feedback control voltage when the AGC circuit is activated. When the circuit 60 is disabled, a relay device prevents the control voltage from varying the capacitor voltage and also prevents the capacitor from charging or discharging. Since the monitoring voltage amplifier has a high impedance, the capacitor does not discharge through the amplifier and therefore the output of the voltage amplifier, which controls the gain of the AGC circuit, remains constant.

The status tone decoder 63 analyzes the signal received from the terminal 61 and produces a high logic state at terminal 63a, and a corresponding low logic state at terminal 63b, if this signal substantially corresponds to the predetermined status tone frequency. The high logic state at terminal 63a activates the automatic gain control circuit 60, as was previously mentioned, and also disables the loss of activity detector 64. The low logic signal at terminal 63b disables the line failure detector circuit 66 and also disables the noise comparison circuit 67. When the status tone is no longer received by the decoder 63, the logic states produced at the terminals 63a and 63b are reversed which results in the enabling of the loss of activity detector 64, the line failure detector 66, and the comparison circuit 67. The voltage logic states at terminals 63a and 63b can be termed detect signals since they indicate whether or not a status tone signal has been decoded (detected). In addition, status tone termination will disable the AGC circuit 60, as previously mentioned.

The disabling of the comparison circuit 67 by the status tone decoder 63 results in maintaining the audio gate 62 closed and thus preventing any signal at terminal 61 from reaching the audio output terminal 28a. Thus the decoder 63 prevents the selection circuit 28 from producing a signal output at terminal 28a when the signal from the transmission link 24 indicates that the receiver 21 is in a squelched condition.

When the receiver 21 becomes unsquelched, detected audio signals from the receiver will appear at terminal 61. The noise floor indicating circuit 70 receives a portion of these signals from the highpass filter 65 and produces a DC noise level indicating signal at its output which corresponds to the background noise level of the received audio signals. The DC output signal of the noise indicating circuit 70 corresponds to the background noise level of the input signal and is produced by analyzing the magnitude of the input signal during pauses which occur between audio tones. Noise floor indicating circuits are generally known in the prior art. The specific circuit used in the preferred embodiment of the present invention is described in the copending U.S. patent application entitled "Noise Floor Indicative Circuit", Ser. No. 604,563, filed Aug. 14, 1975 which is assigned to the same assignee as the present invention.

The highpass filter 65 effectively selects a portion of the audio frequency spectrum which is to be analyzed for its noise content. In the preferred embodiment of the present invention the highpass filter 65 was selected to have a 3db point at 2KHz (kilohertz). Limiting the frequency spectrum of the signals received by the noise indicating circuit 70 does not degrade the preformance of this circuit since, typically, noise is uniformly distributed over the entire audio frequency spectrum. The purpose of using the high pass filter is to minimize the effect of voice and low frequency tones on the noise floor measurement.

The noise indicating signal is coupled to the noise comparison circuit 67 and the loss of activity detector 64. This noise level signal provides a reference level for the loss of activity detector 64 which enables the detector to determine when the audio signal from terminal 61 has a magnitude which does not significantly exceed the background noise level.

The comparison circuit 67 receives the noise level indicating signal from the circuit 70 and compares this signal to the noise reference level present at terminal 28b. The noise reference level at terminal 28b is related to the output of the circuit 70 in whichever one of the selection circuits (28–30) is indicating the lowest noise level. When the noise indicating signal is sufficiently below the reference level, the comparison circuit 67 will supply a low logic signal to the audio gate 62 which results in the passage of the audio signals present at terminal 61 to the audio output terminal 28a. The comparison circuit 67 also provides an indication, by means of a light emitting diode, as to which one of the selection circuits (28, 29, or 30) is supplying the audio signal which has been selected as having the lowest background noise level. In addition, the comparison circuit 67 produces a new noise level reference voltage at the terminal 28b which is related to the noise level indicating signal associated with the selected audio signal. The comparison circuit 67 is rendered operative only when a high logic level, indicating the absence of a status tone signal at the terminal 61, is received from the terminal 63b, and a high logic level, indicating that a line failure has not occurred, is received from the line failure detector 66.

The line failure detector 66 receives logic inputs from the status tone decoder terminal 63b and the terminal 68. The detector 66 produces a disable signal for the comparison circuit 67 when the absence of a status tone is indicated by the decoder 63 at the terminal 63b and when an absence of signal activity, as indicated by the detector 64 at the terminal 68, has existed for more than a predetermined time. Thus if no status tone or audio signal is received for a period of time, approximately 15 seconds, then the line failure detector 66 will disable the comparison circuit 67 and thereby inactivate the selection circuit 28.

In summary, the basic function of the selector circuit 28 is to monitor the output signal from the receiver 21 and select this signal when it does not correspond to the status tone signal and when this signal has a better signal quality level than any of the output signals from the other receivers which also do not correspond to the status tone signal. Thus the selection circuit 28 compares a noise level indicating signal related to the signal quality of the detected audio signals of the receiver 21 to the noise level indicating signals related to the signal quality of the detected audio signals from the other receivers (22 and 23), and selects the detected audio signals having the optimum signal quality level. Since the voting control center 27 comprises three selection circuits, one for each of the receivers 21–23, the basic function of the voting control center is to select, for monitoring purposes, the receiver and transmission link producing the detected audio signals having the best signal quality.

The circuitry used to accomplish the functions of the various block components illustrated in FIG. 5 will now be discussed more fully. The audio gate 62, since it comprises a standard relay circuit responsive to a control voltage, and the highpass filter 65, since it comprises a standard highpass filter, will not be discussed in any detail. Since the automatic gain control 60 has previously been characterized as a standard AGC circuit with a relay type device located in its feedback loop, this device also will not be discussed in any further detail.

Figure 6:
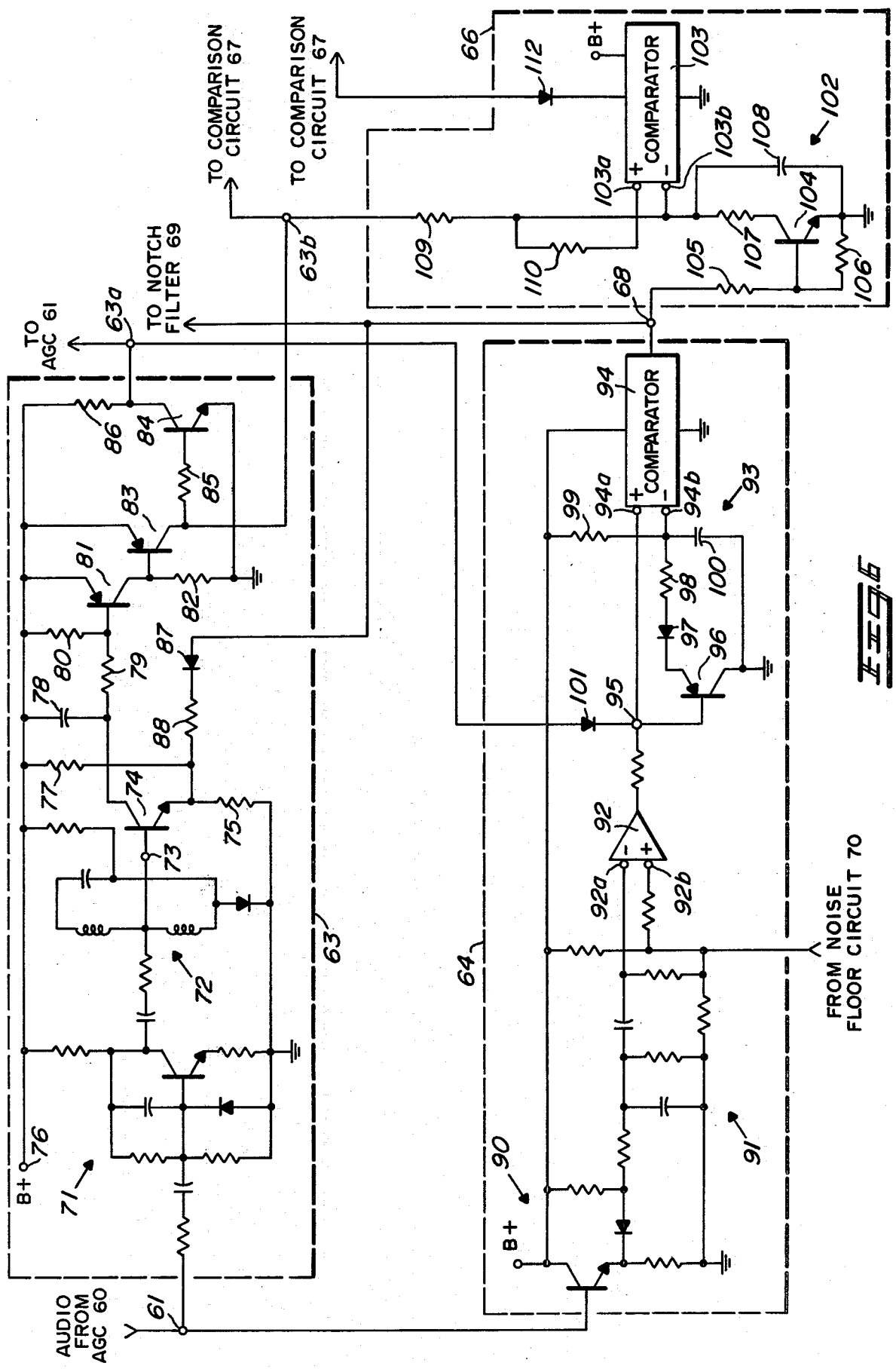
FIG. 6 is a schematic diagram of several of the component blocks shown in FIG. 5.

FIG. 6 is a schematic diagram illustrating simplified practical embodiments of the status tone decoder 63, the loss of activity detector 64 and the line failure detector 66. These three components are shown within dashed lines and identical reference numbers are used to designate terminals and components which are common to FIGS. 5 and 6. The FIG. 6 merely illustrates typical embodiments of the conponents 63, 64 and 66 which perform the functions of these components that were previously discussed in connection with FIG. 5. Only major circuit components in FIG. 6 have been given reference numbers.

The status tone decoder 63 receives audio signals from the terminal 61 and produces a high voltage level logic state at terminal 63a and a complimentary low voltage level logic state at terminal 63b in response to the received audio signals substantially corresponding to the frequency of a predetermined status tone for at least a predetermined minimum time duration. Conversely, a low voltage logic state is created at terminal 63a and a high voltage logic state is created at terminal 63b if the audio signals from terminal 61 do not substantially correspond to the predetermined status tone for this minimum time duration.

The decoder 63 also receives a low logic signal from the loss of activity detector 64 whenever an audio pause is detected. The low logic level from detector 64 reduces the predetermined minimum time duration that the audio signals from terminal 61 must correspond to the status signal before the decoder 63 concludes that a valid status tone is present. Prior to the detection of an audio pause, the decoder 63 receives a high logic signal from the detector 64. This high logic signal effectively disables the decoder 63. Thus the previously mentioned minimum time duration is infinite, whereas the reduced minimum time duration is designed to be 20ms.

The decoder 63 includes a transistor amplifier stage generally designated by the reference number 71 which receives the input audio signals from terminal 61 and amplifies them. The amplifier stage 71 is followed by a tuned circuit stage generally designated by 72 which produces a periodic voltage waveform at a terminal 73 when the frequency of the amplified audio signals substantially corresponds to the resonant frequency of the tuned circuit 72. In the present invention the frequency of the tuned circuit 72 and frequency of the status tone signal are identical.

An NPN transistor 74 has its base directly connected to terminal 73, its emitter connected to ground through a resistor 75 and to a B+ terminal 76 through a resistor 77, and its collector connected to B+ through a capacitor 78 connected in parallel with two series connected resistors 79 and 80.

The junction between resistors 79 and 80 is connected to the base of a PNP transistor 81 which has its emitter connected to B+ and its collector connected to ground through a resistor 82 and directly connected to the base of a PNP transistor 83. The transistor 83 has its emitter connected to B+ and its collector connected directly to the output terminal 63b and connected to the base of a NPN transistor 84 through a resistor 85. The emitter of transistor 85 is connected to ground and its collector is connected to B+ through a resistor 86 and is also directly connected to the output terminal 63a. The loss of activity detector output terminal 68 is connected to the emitter of transistor 74 through a diode 87 connected in series with a resistor 88. The components 71 through 88 generally comprise the status tone decoder circuit 63.

If a large AC signal is present at terminal 73, which occurs when the input audio signals at terminal 61 correspond to the frequency of the status tone signal, the transistor 74 will be periodically pulsed on during the positive peaks of the AC signal. The switching on of the transistor 74 will result in the charging of the capacitor 78 and this in turn eventually results in the switching on of the transistor 81 and the switching off of the transistor 83. The capacitance of the capacitor 78 primarily determines the time duration between the commencement of the periodic turning on of the transistor 74 and the subsequent turning off of the transistor 83.

The transistor 84 is also switched to an off state when the transistor 83 is turned off and this results in the terminal 63a rising to a high (B+) logic level. Thus when a status tone signal is present at terminal 61, a high logic state at the terminal 63a is created and a low logic state at the terminal 63b is created.

Before an audio pause is detected by the loss of activity detector 64, a high logic level is present at the terminal 68. This results in a DC current flowing through the resistors 88 and 75 which in turn results in a raising of the DC voltage present at the emitter of the transistor 74. When a pause is detected by the loss of activity detector 64, a low logic state is created at the terminal 68. This results in a lower emitter voltage for the transistor 74. The turn-on time of the transistor 83 in response to a periodic voltage appearing at the terminal 73 is determined by the periodic cycling on of the transistor 74 which is determined by the voltage present at its emitter and the signal at its base. Thus the detection of an audio pause by the loss of activity detector 64 increases the sensitivity of the transistor 74 to positive voltage waveforms which occur at the terminal 73 and therefore shortens the response time (from infinity to 20ms) of the tone decoder 63 to the occurrence of a status tone signal at the terminal 61. The changing of the sensitivity (response time) of the decoder 63 is beneficial since it prevents the decoder from responding falsely to the presence of random status tone frequencies in a typical detected audio signal (such as voice) present at the terminal 61. Since in the preferred embodiment of the invention a true status tone is always preceded by an audio pause, the status tone detector will rapidly respond to the production of a true squelch indicating status tone by the receiver 21.

The loss of activity detector 64 is essentially a pause detector which receives the audio signals present at the terminal 61 and produces a high logic state at the terminal 68 until an absence of audio signal activity is detected which exists for at least a predetermined minimum duration of time. If a pause in the audio activity occurs, the detector 64 will produce a low logic state at the terminal 68. The occurrence of a low logic state at terminal 68 will speed up (enable) the response of the status tone decoder, as was previously mentioned, switch in the status tone notch filter 69, and activate a timer circuit in the line failure detector 66.

Figure 7:
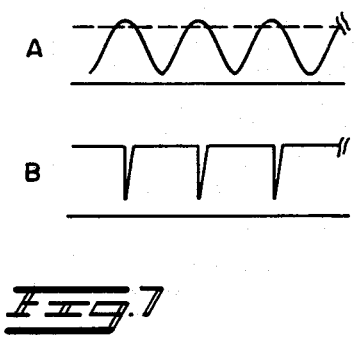
FIG. 7 is a series of graphs illustrating voltage waveforms associated with FIG. 6.

The loss of activity detector 64, shown dotted in FIG. 6, basically comprises a transistorized resistive isolation stage generally designated as 90 followed by an integrating circuit 91 (basically a low pass filter), an operational amplifier 92, a timing circuit generally designated by the reference number 93 and a comparator circuit 94. The isolation stage 90 receives the audio input signals from terminal 61 and provides isolation between terminal 61 and the subsequent integration stage 91. The output of the integrator stage is coupled to an input terminal 92a of the operational amplifier 92. An input terminal 92b of the operational amplifier is coupled to receive a DC level from the noise floor indicating circuit 70 which generally indicates the background noise level of the audio signal present at the terminal 61. The AC audio signal received by the terminal 92a is shown graphically in FIG. 7A and the DC signal received at the terminal 92b is shown (by a dashed line) in the same figure. Operational amplifiers are standard circuits well known in the prior art and the amplifier 92 functions as a high gain amplifier which amplifies the positive difference between the signals present at the terminals 92a and 92b. Thus an output signal is created at an operational amplifier output terminal 95 which is graphically illustrated in FIG. 7B.

The basic function of the transistor isolation stage 90, the integrator 91 and the operational amplifier 92 is to process the incoming audio signals from the terminal 61, compare these signals with a noise floor reference level from the noise floor detector 70, and produce a series of voltage pulses at the output terminal 95 whenever the input AC audio signals exceed the background noise level. If the AC input signals do not exceed the background noise level, the operational amplifier 92 is biased such that a high DC level is maintained at the ouput terminal 95.

By comparing the input audio signal with a signal related to the noise floor (background noise) of the input audio signal, a circuit (64) for accurately measuring the activity of the input signal has been provided. The circuit 64 also prevents the selection circuit 28 from identifying a high noise only input signal as signal activity. This is accomplished by the use of the low pass integrating stage 91 and the comparison of the remaining low frequency (audio) signals with the noise level indicating signal at terminal 92b. Thus only large audio signals, substantially greater than their background noise level, can be identified as signal activity.

The level of signal activity detected by the circuit 64 is subsequently used by the line failure detector 66 to determine if the receiver 21 or the transmission link 24 has failed. The detection of signal activity by the comparison method used in the circuit 64 enables the failure detector 66 to identify an extremely high noise output signal, as well as a lack of substantial signal activity for a predetermined time, as a line failure. The detection of a line failure will prevent the selection of the signal from the receiver 21 until activity or status tone resumes.

The timing circuit 93 basically comprises a PNP transistor 96 having its base connected to the output terminal 95, its collector connected to ground, and its emitter coupled to a negative input terminal 94b of the comparator 94 through a diode 97 connected in series with a resistor 98. The cathode of the diode 97 is directly connected to the emitter of the transistor 96. The terminal 94b is connected to B+ through a resistor 99 and to ground through a capacitor 100. A comparator trigger input terminal 94a is directly connected to the output terminal 95.

The timing circuit 93 generally senses an absence of audio signal activity and produces a rising voltage which will eventually result in the production of a low voltage logic level at terminal 68 unless the rising voltage is reset to a low level by the reoccurrence of audio activity within a predetermined time.

The comparator 94 is basically a DC level comparator which compares the DC voltage level present at the terminal 94b with an internal reference voltage and produces an output signal which is directly coupled to the output terminal 68. The terminal 94a receives negative trigger pulses which generally initiate the DC level comparison. Such comparators basically comprise differential type circuits and are quite well known in the prior art. The specific comparator used in the preferred embodiment of the present invention is a 555 integrated circuit timer manufactured by the Signetics Corporation of Sunnyvale, Calif.

The comparator 94 receives negative pulses at its terminal 94a from the terminal 95. The first negative pulse triggers the comparator 94, sets the terminal 68 to a high logic level, and removes an internal short circuit to ground from the terminal 94b. This allows the voltage at terminal 94b to rise, due to the charging up of the capacitor 100. The voltage at terminal 94b is compared with an internal reference voltage. When the voltage at terminal 94b equals the internal reference voltage, the comparator 94 produces a low logic level at terminal 68, resets itself, and awaits the occurrence of another negative pulse at terminal 94a. Additional negative pulses which occur at the terminal 94a after the first pulse but before the comparator is reset have no effect on the operation of the comparator.

When many AC pulses, which indicate audio activity, are present at the terminal 95, the transistor 96 is periodically turned on which results in the periodic discharging of the capacitor 100. This periodic discharging will maintain the voltage at the terminal 94b substantially below the internal DC reference level whenever audio activity is present. The comparator 94 produces a low logic state at the terminal 68 whenever the DC level at 94b equals the internal reference level. Therefore audio activity at the terminal 61 results in a high logic level always being present at the terminal 68.

Whenever an audio pause occurs, no AC pulses exist at the terminal 95. This results in transistor 96 never being turned on which in turn results in the charging up of the capacitor 100 and a corresponding rising of the voltage level at the terminal 94b. When the voltage at 94b is equal to or greater than the reference level, the comparator 94 will produce a low logic state at the output terminal 68. Thus in response to an audio pause, the timing circuit 93 creates a rising voltage at the terminal 94b which in turn results in the creation of a low logic, pause indicating signal at terminal 68. In the preferred embodiment of the invention the resistor 99 has a resistance which is approximately five times that of resistor 98, thus insuring a rapid discharge of the capacitor 100 through resistor 98 and a slow charge of the capacitor 100 through the resistor 99. The timing circuit 93 senses the duration of an audio pause by slowly charging up the capacitor 100 during the audio signal pause and rapidly discharging the capacitor when audio activity occurs.

A diode 101 has its cathode connected to the terminal 95 and its anode connected to the status tone decoder output terminal 63a. As previously mentioned, when a status tone is detected, a high logic state is created at the terminal 63a. The creation of this high logic state will prevent the occurrence of negative pulses at the terminal 95 and this in turn prevents the transistor 96 from ever being turned on. The effect of this diode connection is to disable the loss of activity detector 64 whenever a status tone has been detected. The diode 101 will prevent the occurrence of large negative pulses at the terminal 95 when a status tone has been detected and thus prevents the turning on of the transistor 96 which would lower the voltage at the terminal 94b and create a high logic level at the output terminal 68. Thus the diode 101 maintains a high logic level at the output terminal 68 whenever a status tone is being detected by the decoder 63.

A typical line failure detector circuit 66, shown dashed in FIG. 6, essentially comprises a capacitive timer circuit 102 and a comparator circuit 103 having trigger and input terminals 103a and 103b, respectively. The basic function of the line failure circuit is to determine when an audio pause has existed for a substantially long period of time, such as 15 seconds. This is in contrast with the loss of activity detector 64 which produces an indicating logic level whenever an audio pause of 10ms occurs.

Whenever an extended period of time, such as fifteen seconds, exists during which no audio activity or status tone is received by the selection circuit 28, the line failure detector 66 concludes that either the receiver 21 or the transmission link 24 has failed and will terminate the functioning of the selector circuit 28 by disabling the comparison circuit 67. The failure detector circuit 66 will be reset by the occurrence of either audio activity or status tone, and this results in the enabling of the comparison circuit 67.

The timing circuit 102 comprises an NPN transistor 104 having its base connected to terminal 68 through a resistor 105 and to ground through a resistor 106, its emitter directly connected to ground, and its collector connected to terminal 103b through a resistor 107. The terminal 103b is also connected to ground through a timing capacitor 108 and connected to terminal 63b through a resistor 109. The comparator trigger terminal 103a is connected to terminal 103b through a resistor 110 and thereby receives negative trigger pulses from terminals 63b and 68. The output of the comparator 103 is coupled through a diode 112 to the comparison circuit 67 and the anode of diode 112 is directly connected to the comparator 103. The line failure detector 66 basically comprises all of the components 102 through 112.

The comparator 103 is identical to the comparator 94 in the loss of activity detector 64 and both comparators function identically. After a negative pulse at terminal 103a, a high output logic voltage is produced until the terminal 103b has a DC voltage equal to or larger than an internal reference voltage.

Whenever a status tone is detected by the decoder 63, a low logic voltage is produced at the terminal 63b. The generation of this voltage will trigger comparator 103 but will also prevent the charging up of the capacitor 108. Thus a low voltage at the terminal 103b is maintained. This insures that the line failure detector 66 will always have a high output logic state whenever a status tone exists at the audio input terminal 61.

When a status tone is not detected by the decoder 63, a high logic voltage is created at the terminal 63b which results in the charging up of the capacitor 108. Whenever activity is detected by the loss of activity detector 64, a high voltage logic level is produced at the output terminal 68 which results in the switching on of the transistor 104. This provides a negative pulse to the trigger terminal 103a, but also prevents the capacitor 108 from charging up to a high voltage level. Thus only when a status tone is not present at the input terminal 61 and a pause in audio activity is detected by the loss of activity detector 64 will the capacitor 108 be able to charge up to a high voltage level. The charging response time of the capacitor is determined by the resistor 109 and the capacitance of the capacitor 108. When the voltage at the terminal 103b becomes equal to or greater than the internal reference voltage, the comparator 103 will produce a low logic level at its output which will be coupled to the comparison circuit 67 through the diode 112. Therefore the line failure detector circuit 66 only produces a logic level change when no status tone and no audio activity is present at the input terminal 61 for a predetermined length of time.

The timing circuit 102 and the comparator 103 are automatically reset whenever activity is again detected by the loss of activity detector 64. This is because a detection of activity results in a high voltage at terminal 68 which turns on the transistor 104 and thereby discharges the capacitor 108. The turning on of transistor 104 provides a negative pulse at the terminal 103a to reset comparator 103.

Figure 8:
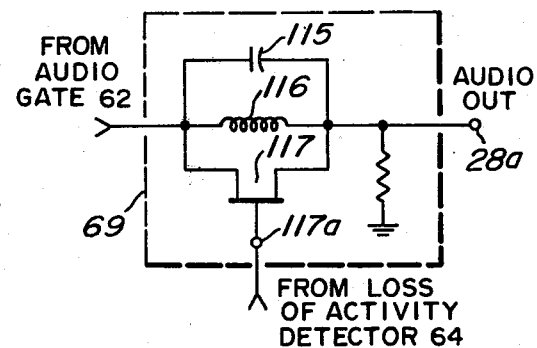
FIG. 8 is a schematic diagram of one of the component blocks shown in FIG. 5.

Referring to FIG. 8, a practical embodiment of the switchable status notch tone filter 69 (shown dashed) is illustrated. The filter 69 comprises a capacitor 115 connected in parallel with an inductor 116 connected in parallel across the through current terminals of a semiconductor relay device 117, such as a field effect transistor. A control terminal 117a of the relay device receives the output logic levels from the loss of activity detector 64, in particular from terminal 68. The device 117 produces a short between its current through terminals in response to a high logic level being received at its control terminal and conversely produces an open circuit between its current through terminals in response to a low logic level being received at its control terminal. Thus the switchable notch filter 69 is inserted whenever the loss of activity detector 64 indicates, by a low logic level, a pause in the audio activity of the signals received at terminal 61.

The components 115 and 116 are selected to form a tuned circuit which is parallel resonant at the status tone frequency and therefore prevents the passage of this tone whenever a low logic level is received by the control terminal 117a. Therefore switchable notch filter 69 prevents the appearance of a signaling status tone at the selected output terminal 28a of the selection circuit 28.

Figure 9:
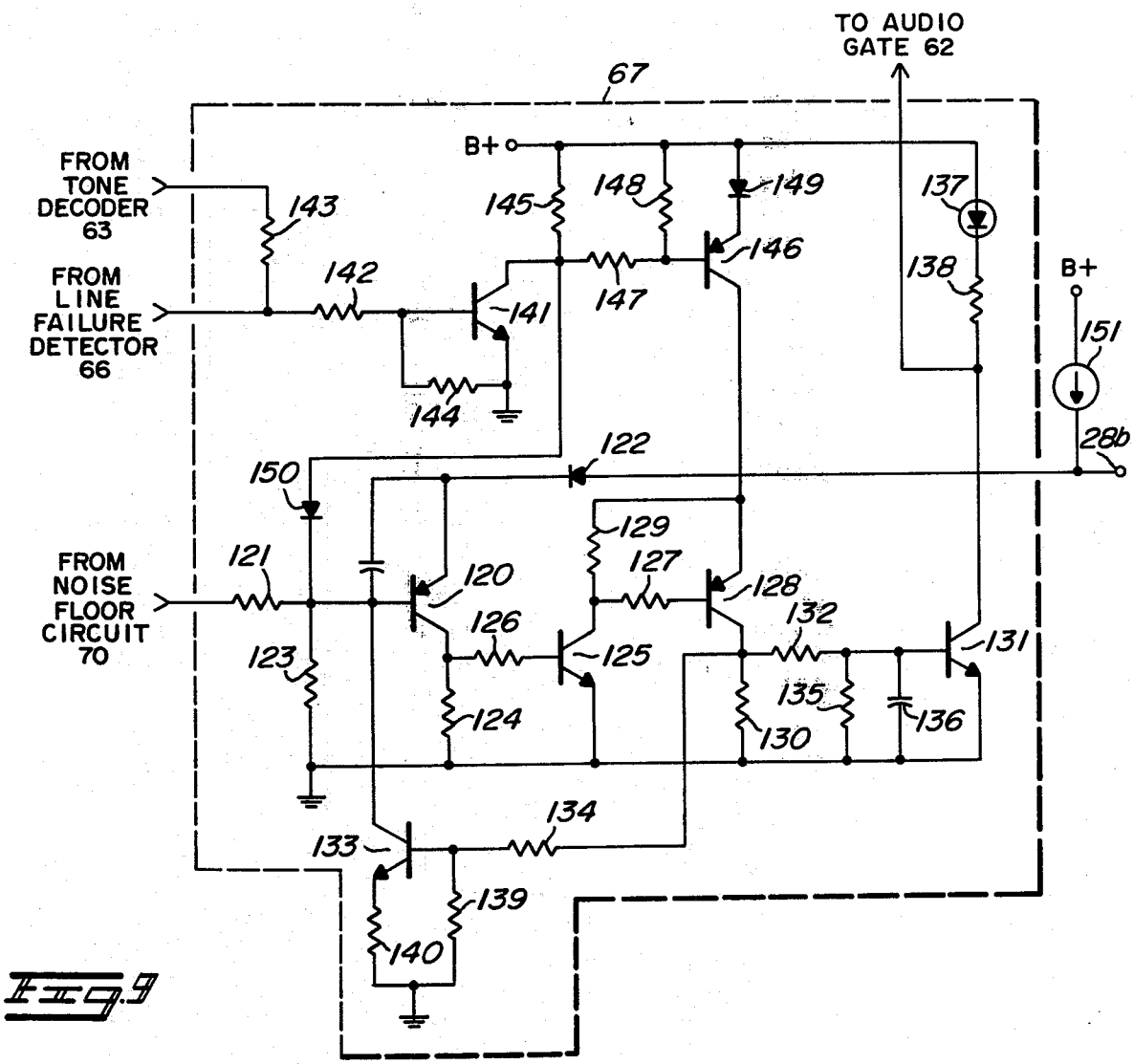
FIG. 9 is a schematic diagram of another one of the component blocks illustrated in FIG. 5.

In FIG. 9 a schematic diagram of the comparison circuit 67 (shown dashed) is illustrated. Components and connections corresponding to those shown in previous figures have been identically numbered. The basic function of the comparison circuit 67 is to compare the noise floor indicating signal received from the floor circuit 70 with the noise reference level voltage present at terminal 28b. Whenever the DC voltage received from the floor circuit 70 is a sufficient amount below the noise reference level voltage, the comparison circuit 67 will be activated and produce a low logic level which will open the audio gate 62. The comparison circuit 67 then creates a new noise level reference voltage at the terminal 28b and also provides an indication as to which selection circuit (28, 29, or 30) has a comparison circuit which has been activated.

The comparison circuit 67 comprises a PNP transistor 120 which receives the noise level indicating voltage from the noise floor circuit 70 at its base terminal through a resistor 121. The emitter of transistor 120 is coupled to the noise reference level terminal 28b through a diode 122 which has its anode directly connected to terminal 28b. The transistor 120 has its base connected to ground through a resistor 123 and its collector connected to ground through a resistor 124 and to the base of an NPN transistor 125 through a resistor 126. The emitter of transistor 125 is connected to ground and its collector is connected through a resistor 127 to the base of a PNP transistor 128. The emitter of transistor 128 is connected to the collector of the transistor 125 through a resistor 129. The collector of transistor 128 is connected to ground through a resistor 130, to the base of an NPN transistor 131 through a resistor 132, and to the base of an NPN transistor 133 through a resistor 134. The transistor 131 has its base connected to ground through a resistor 135 connected in parallel with a capacitor 136, its emitter directly connected to ground, and its collector connected to B+ through a light emitting diode 137 in series with a resistor 138. The collector of transistor 131 is also coupled to the audio gate 62. The transistor 133 has its base connected to ground through a resistor 139, its emitter connected to ground through a resistor 140, and its collector connected to the base of transistor 120.

The logic input from the failure detector 66 is coupled to the base of an NPN transistor 141 through a resistor 142, while the logic input from the tone decoder 63 is coupled to the base of transistor 141 through a resistor 143 connected in series with the resistor 142. The base of the transistor 141 is connected to ground through a resistor 144 and the collector of this transistor is connected to B+ through a resistor 145 and to the base of a PNP transistor 146 through a resistor 147. The transistor 146 has its base connected to B+ through a resistor 148, its collector connected to the emitter of transistor 128, and its emitter connected to B+ through a diode 149 which has its anode connected directly to B+. The collector of transistor 141 is coupled to the base of transistor 120 through a diode 150 which has its cathode directly connected to the base of transistor 120. The components 120 to 150 comprise the comparison circuit 67.

The comparison circuit 67 receives a DC noise indicating voltage signal from the noise floor circuit 70 and compares this voltage to the voltage received from the noise reference terminal 28b. The transistor 120 performs the actual voltage comparison, and when its base voltage is sufficiently below its emitter voltage this transistor is turned on which results in the subsequent turning on of transistors 125, 128, 131, and 133. The actuation of the transistor 131 causes the light emitting diode 137 to turn on and also produces a low collector voltage which is coupled to the audio gate 62 for actuation thereof. Thus when the transistor 120 is actuated, a selection is made by the comparison circuit 67 which results in the coupling of an audio signal from the input terminal 61 to the selected output terminal 28a of the selection circuit 28. The occurrence of a selection is indicated by the turning on of the light emitting diode 137 which indicates which receiver, in this case receiver 21, is producing the selected lowest noise level audio signal received by the signal voting control center 27.

The actual noise level signal received at the base of transistor 120 is a fraction of the noise level indicating signal from the circuit 70 because of the voltage divider action of the resistors 121 and 123. Once the comparison circuit 67 has been actuated, the transistor 133 lowers the voltage received by the base of transistor 120. This creates a hysteresis type effect, in that now the base voltage is lower than it was before the actuation of the comparison circuit 67. The hysteresis effect prevents any switching back and forth between different comparison circuits in different selection circuits whenever minor differences are present between the actual noise level signals received from different noise floor circuits. After the transistor 120 has been turned on, the voltage at the noise level reference terminal 28b is pulled down and maintained at two diode drops above the voltage at the base of the transistor 120. This is due to the forward biased diode drops of the diode 122 and the base emitter junction of the transistor 120.

When a status tone is not being received, a high voltage logic is received from the decoder 63 by the comparison circuit 67. This voltage logic will turn on the transistor 141 which subsequently turns on the transistor 146 which supplies DC operating power to the transistors 125 and 128. If a line failure is detected when no status tone is being received, a low voltage logic level is produced by the line failure detector 66. This low logic level will turn off the transistor 141 and prevent the actuation of transistors 125 and 128, thus effectively disabling the comparison circuit 67. If a status tone is being received, the tone decoder 63 produces a low logic level which also results in the turning off of transistor 141, since the output logic voltage of the detector 66 is insufficient to turn on transistor 141.

Whenever the transistor 141 is turned off, the collector of this transistor rises to a high voltage which in turn raises the voltage level at the base of the transistor 120 because of the action of diode 150. Thus whenever the comparison circuit 67 is disabled, by either a status tone being detected by decoder 63 or a line failure being detected by detector 66, the voltage at the base of 120 will be forced to a new higher level. This higher base voltage will no longer represent the noise level indicating voltage produced by the circuit 70. Also, the voltage at the noise reference terminal 28b will not be maintained at two diode drops above the base of transistor 120, since the diode 122 and the base emitter junction of the transistor 120 are back biased. The voltage at terminal 28b will now be determined by a selection circuit other than circuit 28. In addition, the transistor 120 will be turned off resulting in the turning off of the transistor 131 and the light emitting diode 137, and also resulting in the opening up of the audio gate 62. Thus the selection circuit 28 is effectively prevented from selecting the audio signal from receiver 21 whenever a valid status tone or a line failure occurs.

In FIG. 9 a constant current generator 151 is shown outside the comparison circuit 67 and is generally used to provide current to the terminals 28b, 29b and 30b of the selection circuits 28, 29, and 30 in the signal voting control center 27. Thus if no selection circuit is receiving a proper signal from its corresponding receiver, the noise reference terminals 28b, 29b and 30b will be at a common high voltage level. Once a selection circuit is actuated, the noise reference terminals will be held at a common lower voltage level related to the background noise level of the selected audio signal which will be coupled to the speaker 32. The constant current generator 151 insures that only one comparison circuit will be turned on, since the generator 151 can only supply enough current to turn on one comparison circuit, such as circuit 67.

While I have described in detail the functioning of a single selection circuit 28, the functioning of the selection circuits 29 and 30 is identical and any number of such selection circuits can be combined with any number of receiver inputs to provide a viable receiver voting system which has all of the advantages previously discussed.

While I have shown and described specific embodiments of this invention, further modifications and improvements will occur to those skilled in the art. All such modifications which retain the basic underlying principles disclosed and claimed herein are within the scope of this invention.

We claim:

1. An improved receiver voting system for selecting at least one of several signals to be monitored, said system comprising:
 a plurality of receivers, each receiver including means for receiving input signals and producing an output signal, said output signal substantially corresponding to said input signals in response to said input signals having a magnitude equal to and above a predetermined level and substantially corresponding to a predetermined status signal in response to the magnitude of said input signals being below said predetermined level;
 a plurality of transmission line means for coupling the output signal of each of said plurality of receivers to a comparison location;
 signal voting circuit means located at said comparison location for receiving the output signals of each of said receivers and selecting, for monitoring purposes, the one of said output signals which has the optimum signal quality level of all of the received output signals which correspond to said input signals; and
 load means for receiving the selected output signal;
 each of said output signal producing means of said receivers including,
 variable squelch means for delaying by a first predetermined time the response of said output signal producing means to a change in the magnitude of said received input signals from below to above said predetermined level, said first predetermined time being related to the amount that the magnitude of said received input signals is above said predetermined level, and
 delay means for creating, in response to a change in the magnitude of said input signals from above to below said predetermined level, an output signal pause which precedes in time the production of said output signal which corresponds to said status signal;
 said voting circuit means including,
 decoder means for producing, when said detector means is enabled, detect signals associated with any of said output signals which correspond to said status signal for at least a minimum time duration, said detect signals being used in preventing the selection of any output signal which corresponds to said status signal,
 loss of activity means for detecting a loss of signal activity in each of said output signals and producing associated enable signals by comparing each of said output signals with an associated signal related to the background noise level of said output signal,
 line failure detector means coupled to said loss of activity means for preventing the selection of any of said output signals in which a detected loss of signal activity exists for at least a predetermined duration of time,
 circuitry for coupling said loss of activity detector means to said decoder means and, in response to a pause being detected in any of said output signals, enabling said decoder means for any of said output signals which include a detected pause,
 filter means coupled to said loss of activity means and between said load means and said transmission line means for inserting a status signal filter between said load means and said transmission line means in response to a signal pause being detected by said loss of activity detector, said status signal filter preventing the load means from responding to a selected output signal having a detected audio pause followed by said status signal, and
 signal loss equalization means for separately amplifying each of said received output signals by a gain factor which substantially compensates for the magnitude variation of said received output signals contributed by said transmission line means, whereby said voting circuit means compares said compensated output signals in order to select the output signal having the optimum signal quality level.

2. An improved receiver voting system for selecting at least one of several signals to be monitored, said system comprising:
 a plurality of receivers, each receiver including means for receiving input signals and producing an output signal, said output signal substantially corresponding to said input signals in response to said input signals having a magnitude equal to and above a predetermined level and substantially corresponding to a predetermined status signal in response to the magnitude of said input signals being below said predetermined level;
 each receiver including a delay means for creating, in response to the magnitude of said input signals changing from above to below said predetermined level, an output signal pause which precedes in time the production of said output signal which corresponds to said status signal;

a plurality of transmission line means for coupling the output signals of each of said plurality of receivers to a comparison location;

signal voting circuit means located at said comparison location for receiving the output signals of each of said receivers and selecting, for monitoring purposes, the one of said output signals which has the optimum signal quality level of all of the received output signals which correspond to said input signals; and load means for receiving the selected output signal;

said voting circuit means including a pause detector means for detecting the presence of a signal pause in the selected output signal, and filter means coupled to said pause detector means and between said load means and said transmission line means for inserting a status signal filter between said load means and said transmission line means in response to a signal pause being detected by said pause detector, said status signal filter preventing the load means from responding to a status signal portion of the selected output signal in which a detected audio pause is followed by said status signal.

3. An improved receiver voting system according to claim 2 which includes status decoder means for producing detect signals associated with any of said output signals which correspond to said status signal, and circuitry coupled to said filter means and said decoder means for maintaining the insertion of said filter means in response to the production of said detect signals.

4. An improved receiver voting system according to claim 2 wherein said signal voting circuit means includes status signal decoder means for producing detect signals associated with any of said output signals which correspond to said status signal, said detect signals preventing said signal voting circuit means from selecting an output signal which corresponds to said status signal.

5. An improved receiver voting system for selecting at least one of several signals to be monitored, said system comprising:

a plurality of receivers, each receiver including means for receiving input signals and producing an output signal, said output signal substantially corresponding to said input signals in response to said input signals having a magnitude equal to and above a predetermined level and corresponding to a predetermined status signal in response to the magnitude of said input signals being below said predetermined level;

each of said receivers including a variable squelch means for delaying by a first predetermined time the response of said output signal producing means to a change in the magnitude of said received input signals from below to above said predetermined level, said first predetermined time being related to the amount that the magnitude of said received input signals is above said predetermined level;

a plurality of transmission line means for coupling the output signals of each of said plurality of receivers to a comparison location;

signal voting circuit means located at said comparison location for receiving the output signals of each of said receivers and selecting, for monitoring purposes, the one of said output signals which has the optimum signal quality level of all of the received output signals which correspond to said input signals, whereby said variable squelch means results in said receiver voting system initially selecting the strongest received input signals by producing the smallest predetermined time delay for the strongest received input signals.

6. An improved receiver voting system for selecting at least one of several signals to be monitored said system comprising:

a plurality of receivers, each receiver including means for receiving input signals and producing an output signal, said output signal substantially corresponding to said input signals in response to said input signals having a magnitude equal to and above a predetermined level and corresponding to a predetermined status signal in response to the magnitude of said input signals being below said predetermined level;

a plurality of transmission line means for coupling the output signals of each of said plurality of receivers to a comparison location; and signal voting circuit means located at said comparison location for receiving the output signals of each of said receivers, amplifying and selecting, for monitoring purposes, the one of said amplified output signals which has the optimum signal quality level of all of the received and amplified output signals which correspond to said input signals;

said voting circuit means including signal loss equalization means for producing said amplified output signals by separately amplifying each of said received output signals by a gain factor which substantially compensates for the magnitude variation of said received output signals contributed by said transmission line means, said loss equalization means including means for amplifying each of said received output signals by a variable gain factor for maintaining the magnitude of the amplified output signal at a constant level in response to said amplified output signal corresponding to said status signal and means for amplifying each of said received output signals by a constant gain factor in response to said output signal substantially corresponding to said input signals.

7. An improved receiver voting system according to claim 6 wherein said constant gain factor corresponds to the variable gain factor which existed just before said output signal was detected as corresponding to said input signals.

8. An improved receiver voting system according to claim 7 wherein said loss equalization means includes a status signal decoder means coupled to said AGC means, said decoder means receiving each of said output signals, detecting when said output signals correspond to status signals and producing a detect signal for controlling the gain of said AGC means, whereby the occurrence of said detect signal fixes the gain of said AGC means at the variable gain factor which existed just prior to the production of said detect signal.

9. An improved receiver voting system for selecting at least one of several signals to be monitored, said system comprising:

a plurality of receivers, each receiver including means for receiving input signals and producing an output signal, said output signal substantially corresponding to said input signals in response to said input signals having a magnitude equal to and above a predetermined level and corresponding to a predetermined status signal in response to the magnitude of said input signals being below said predetermined level;

a plurality of transmission line means for coupling the output signals of each of said plurality of receivers to a comparison location; and signal voting circuit means located at said comparison location for receiving the output signals of each of said receivers, comparing said received output signals and selecting, for monitoring purposes, the one of said output signals which has the optimum signal quality level of all of the received output signals which correspond to said input signals;

said voting circuit means including, means for receiving each of said output signals and producing associated signals related to the background noise level of each of said output signals, loss of activity means coupled to said associated noise level signal producing means for detecting a loss of signal activity in each of said output signals by comparing each of said output signals with the associated signal related to the background noise level of said output signal, and line failure detector means coupled to said loss of activity means for preventing the selection of any of said output signals in which a detected loss of signal activity exists for at least a predetermined duration of time.

10. An improved receiver voting system according to claim 9 wherein said voting circuit means includes comparison means coupled to said associated noise level signal producing means for receiving each of said associated background noise level signals and comparing them for selecting the output signal to be monitored.

11. A signal decoding system for a received signal having information signals followed by a pause in activity and then followed by a status coding tone, said system rapidly identifying a proper status coding tone while effectively ignoring any information signals that may accidently correspond to said status coding tone, said system comprising:

decoder means for producing detect signals associated with said received signal in response to said received signal substantially corresponding to said status coding tone for at least a minimum time, said detect signals indicating the presence of a proper status coding tone;

loss of signal activity detector means for detecting the presence of pause in the activity of said received signal and producing a pause detect signal; and control means for coupling said pause detect signal from said loss of activity detector means to said decoder means for reducing said minimum time duration of said decoder means in response to a pause detection by said loss of activity detector means, whereby said decoder means is prevented from rapidly responding to information signals which momentarily correspond to said status coding tone and said decoder means is permitted to more rapidly respond to any status coding tones which are preceded by a pause.

12. An improved transmission line loss compensating system comprising:

at least one receiver means for producing an output signal which includes sequential information and status signals, said status signals having a constant amplitude;

transmission line means for coupling said output signal to a location; and circuit means located at said location for receiving said output signal and amplifying said output signal by a gain factor to compensate for any signal loss due to said transmission means, said circuit means including AGC means for amplifying said output signal by a variable gain factor to maintain the amplified output signal at a constant predetermined amplitude level in response to said output signal being detected as corresponding to said status signals, said AGC means including circuitry for amplifying said output signal by a fixed gain factor in response to said output signal being detected as corresponding to said information signals, said fixed gain factor being substantially the same as the variable gain factor which existed just prior to said output signal being detected as corresponding to said information signals, whereby the transmission line loss is exactly compensated for when said output signal corresponds to said status signal and the loss is substantially compensated for when said output signal corresponds to said information signals.

13. An improved communication decoding system for compensating for the response time of a decoder, said system comprising:

at least one receiver means for producing an output signal which includes information signals followed by an anticipation signal and then followed by a code signal; and circuit means for receiving said output signal and selectively coupling said output signal to a load;

said circuit means including, decoder means for producing at least one detect signal in response to said output signal corresponding to said code signal for at least a minimum duration of time, said detect signal adaptable for use by said circuit means to prevent said load from receiving said code signal, detector means for detecting the occurrence of said anticipation signal in said output signal, and filter means coupled to said load and said detector means for preventing said load from receiving said code signal for a predetermined time after said anticipation signal has been detected, whereby said load can receive said information signal portion of said output signal, is prevented from receiving said code signal portion of said output signal during said minimum duration of time of said decoder means by said anticipation signal detector means and said filter means, and can be prevented from receiving said code signal portion of said output signal after said minimum duration of time by utilization of said decoder code detect signal.

14. An improved communication decoding system according to claim 13 wherein said anticipation signal comprises a pause in output signal activity and wherein this pause is detected by said detector means.

15. An improved communication decoding system according to claim 14 wherein said filter means only prevents said load from receiving said code signal portion of said output signal and otherwise permits said load to receive said output signal.

16. An improved receiver voting system for selecting at least one of several signals to be monitored, said system comprising:

a plurality of receivers, each receiver including means for receiving input signals and producing an output signal, said output signal substantially corresponding to said input signals in response to said input signals having a magnitude equal to and above a predetermined level and corresponding to a predetermined status signal in response to the magnitude of said input signals being below said predetermined level;

each of said output signal producing means of said receivers including a variable squelch means for delaying by a first predetermined time the response of said output signal producing means to a change in the magnitude of said received input signals from below to above said predetermined level, said first predetermined time being related to the amount that the magnitude of said received input signals is above said predetermined level;

each of said output signal producing means of said receivers including rapid squelch means for producing the termination of said output signal which corresponds to said input signals within a second predetermined time duration after the magnitude of said input signal has fallen below a preset level, said second predetermined time being substantially less than said first predetermined time;

a plurality of transmission line means for coupling the output signals of each of said plurality of receivers to a comparison location;

signal voting circuit means located at said comparison location for receiving the output signals of each of said receivers and selecting, for monitoring purposes, the one of said output signals which has the optimum signal quality level of all of the received output signals which correspond to said input signals.

17. An improved receiver voting system according to claim 16 wherein said variable and rapid squelch means are coupled in parallel to a logic combining gate which produces a control voltage for an audio squelch gate.

18. An improved receiver voting system for selecting at least one of several signals to be monitored, said system comprising:

a plurality of receivers, each receiver including means for receiving input signals and producing an output signal, said output signal substantially corresponding to said input signals in response to said input signals having a magnitude equal to and above a predetermined level and corresponding to a predetermined status signal in response to the magnitude of said input signals being below said predetermined level;

each of said output signal producing means of said receivers including a variable squelch means for delaying by a first predetermined time the response of said output signal producing means to a change in the magnitude of said received input signals from below to above said predetermined level, said first predetermined time being related to the amount that the magnitude of said received input signals is above said predetermined level;

each output signal producing means of said receivers includes a coded squelch means coupled in parallel with said variable squelch means to a logic combining gate means for delaying the production of said output signal which corresponds to said input signals until a predetermined code has been identified as existing on said received input signals, a plurality of transmission line means for coupling the output signals of each of said plurality of receivers to a comparison location;

signal voting circuit means located at said comparison location for receiving the output signals of each of said receivers and selecting, for monitoring purposes, the one of said output signals which has the optimum signal quality level of all of the received output signals which correspond to said input signals.

19. A signal decoding system for a received signal having information signals followed by a pause in activity and then followed by a status coding signal, said system rapidly identifying a proper status coding signal while effectively ignoring information signals which may accidently correspond to said status coding signal, said system comprising:

decoder means for producing, when said decoder means is enabled, detect signals associated with said received signal in response to said received signal substantially corresponding to said status coding signal for at least a minimum duraton of time;

loss of signal activity detector means for detecting the presence of a pause in the activity of said received signal; and control means coupled between said loss of activity detector means and said decoder means for enabling said decoder means in response to a detection of a pause in activity by said loss of activity detector means, whereby said decoder means is prevented from responding to information signals which may correspond to said status coding signal for said minimum duration while said decoder means is permitted to respond to a status coding signal of said minimum duration which is preceded by a audio pause.

20. A signal decoding system according to claim 19 wherein said status coding signal comprises at least one audio tone and said information signals comprise audio tones.

21. An improved receiver voting system for selecting at least one of several signals to be monitored, said system comprising:

a plurality of receivers, each receiver including means for receiving input signals and producing an output signal having a pause in activity, said output signal substantially corresponding to said input signals in response to said input signals having a magnitude equal to and above a predetermined level and substantially corresponding to a predetermined status signal in response to the magnitude of said input signals being below said predetermined level;

a plurality of transmission line means for coupling the output signal of each of said plurality of receivers to a comparison location; and signal voting circuit means located at said comparison located for receiving the output signals of each of said receivers and selecting, for monitoring purposes, the one of said output signals which has the optimum signal quality level of all of the received output signals which correspond to said input signals;

said voting circuit means including, decoder means for producing, when said decoder means is enabled, detect signals associated with any of said output signals which correspond to said status signal for at least a minimum time duration, said detect signals adaptable for use in preventing the selection of any output signal which corresponds to said status signal, loss of activity decoder means for detecting the presence of a pause in the activity of any of the output signals, and circuitry for coupling said loss of activity detector means to said decoder means and, in response to a pause being detected in any of said output signals, enabling said decoder means for any of said output signals which include a detected pause, whereby said decoder means will respond in said minimum time duration to a status signal following said detected pause.

22. An improved receiver voting system according to claim 21 wherein each of said receiver output signal producing means includes circuitry for creating said pause in said output signal in response to the magnitude of said received input signals falling below said predetermined level.

* * * * *